United States Patent [19]

Shobert et al.

[11] Patent Number: 4,857,124

[45] Date of Patent: Aug. 15, 1989

[54] FIBER-REINFORCED PLASTIC STRUT CONNECTING LINK

[75] Inventors: James P. Shobert, South Bend; Elson B. Fish, Lakeville, both of Ind.

[73] Assignee: Plas/Steel Products, Inc., Walkerton, Ind.

[21] Appl. No.: 132,774

[22] Filed: Dec. 14, 1987

[51] Int. Cl.$^4$ .................................................. D04C 1/00
[52] U.S. Cl. ..................................... 156/149; 156/172; 156/393; 87/1; 87/9
[58] Field of Search .......................... 156/149, 393, 172; 87/1, 9, 34, 23; 52/726, 727, 309.1; 74/579 R, 581; 174/178; 464/181; 428/225, 245

[56] References Cited

U.S. PATENT DOCUMENTS

| | | | |
|---|---|---|---|
| 2,983,182 | 5/1961 | Shobert | 156/393 X |
| 3,007,497 | 11/1961 | Shobert | 156/149 X |
| 3,553,978 | 1/1971 | Williams | 464/181 |
| 3,592,884 | 7/1971 | Williams | 464/181 X |
| 4,411,114 | 10/1983 | Wurtinger et al. | 52/309.1 |

Primary Examiner—Michael W. Ball
Assistant Examiner—Jeff H. Aftergut
Attorney, Agent, or Firm—Pearne, Gordon, McCoy & Granger

[57] ABSTRACT

A method of fabricating a fiber-reinforced plastic article having first, second, and third cylindrical portions is disclosed. A helical braid is applied along a first cylindrical portion as a first cylindrical sleeve which conforms to and encases the outside surface of said first cylindrical portion. The second cylindrical portion is passed through the filaments forming the braid and the braid is collapsed into a first, substantially flat, double-ply braided ribbon which is then wrapped about the outer surface of the second intersecting portion. The helical braid is again applied along the first cylindrical portion and a second braided ribbon is then wrapped about the outer surface of the third cylindrical portion. The fibers are impregnated with a thermosetting resin which is cured to produce the article.

23 Claims, 3 Drawing Sheets

FIBER-REINFORCED PLASTIC STRUT CONNECTING LINK

BACKGROUND OF THE INVENTION

This invention relates to fiber-reinforced plastic articles and, more particularly, to a fiber-reinforced plastic connecting link or strut having a cylindrical body portion and first and second hollow cylindrical end portions having parallel axes which intersect the longitudinal axis of the cylindrical body portion.

Articles produced by this invention have particular utility as connecting rods in machinery where it is desirable to employ a lightweight connecting rod processing high tensile, compressive, and torsional strengths. Such characteristics are particularly desirable for automotive and aircraft applications where strength-to-weight ratios are important design desiderata.

Various techniques have been proposed for fabricating fiber-reinforced plastic rodlike articles which include variations of the basic pultrusion techniques developed by Francis and Meek in U.S. Pat. Nos. 2,602,766 and 2,684,318, respectively, and later perfected by Shobert in U.S. Pat. Nos. 2,852,425; 2,983,182; 3,007,497; and 3,033,729.

In Meek, U.S. Pat. No. 2,684,318, there is disclosed and claimed a method for fabricating glass-reinforced plastic rods of solid cross section. In Francis Pat. No. 2,602,766, there is disclosed a method of fabricating hollow glass-reinforced plastic rods. These hollow rods are fabricated by first arranging a plurality of glass threads into a longitudinal bundle, inserting a mandrel into the central portion of the bundle so as to provide a core therefor, and, finally, braiding glass thread around the outer surface of the thread bundle. This braided bundle is thereafter immersed in resin which is cured to firmly bond the threads together in self-supporting form. The mandrel is thereupon removed, thereby providing a hollow center for the finished rod.

In Shobert U.S. Pat. No. 2,983,182, the patentee discloses a technique for fabricating tubing composed of two tubular laminations, the inner lamination comprising substantially straight, longitudinal threads distributed evenly circumferentially, and the outer lamination comprising helically wound threads. In U.S. Pat. No. 3,007,497 to Shobert, the patentee provides a technique for interlocking helical and longitudinal strands to ensure that the longitudinal strands will be evenly distributed about the circumference of the rod.

All of these techniques are directed to batch or continuous operations for producing fiber-reinforced plastic rods wherein the fibers are helically woven on a mandrel or longitudinally arranged with or without a supporting mandrel, and wherein the weaving or arranging progresses along a single axis. To applicant's knowledge, no attempt has been made to conduct weaving or filament laying operations on a winding form which includes a plurality of cylindrical portions having intersecting means.

SUMMARY OF THE INVENTION

This invention provides techniques for weaving or braiding filaments which includes a winding form which has a plurality of cylindrical portions having intersecting axes with the fibers being woven and laid on the form as continuous filaments. According to this invention, a winding form is provided having first and second intersecting cylindrical portions. These portions may be arranged with the second intersecting cylindrical portion at right angles to the first cylindrical portion, and may be hollow so that a suitable bearing or bushing may be provided therein. The other end of the first cylindrical member may be provided with a similar cylindrical member.

A helical braid of woven continuous filaments is applied to the cylindrical surface of the first portion by employing a braiding technique similar to that described in U.S. Pat. No. 3,007,497. The roving strands are initially gathered and tied at the midportion of the first cylindrical portion, and the weaving operation is performed to form a sleeve from the midportion of the first cylindrical portion to the angularly related second cylindrical portion. During this weaving operation, the roving filaments extending from the roving cakes to the mandrel tend to form a conical tentlike arrangement which resembles a maypole. When the first portion of the article has been braided in the foregoing manner, the second cylindrical surface is passed through the filaments forming the cone and the braiding operation is continued to form a substantially flat, double-ply braided ribbon. In order to prevent this ribbon from becoming distorted due to the lack of a supporting mandrel, a flat, flexible sheet is inserted between the plies. The ribbon is braided until it has a longitudinal extent corresponding to the circumference of the second cylindrical position. The ribbon is wrapped around the second cylindrical position and the first cylindrical portion is reinserted between the filaments so that its axis once again corresponds to the original braiding axis. The braiding operation is resumed so that a second sleeve is formed on the first cylindrical portion and the weaving operation is continued until the sleeve reaches a third cylindrical portion at the other end of the first cylindrical portion. The ribbon forming operation is performed to provide the third cylindrical portion with a circumferential braid, and the weaving operation is again resumed on the first cylindrical portion to provide a third sleeve which terminates at the midportion of the first cylindrical portion.

After these operations have been performed, the fibrous article is impregnated with a suitable thermosetting resin by placing the article in a mold which closely conforms to the shape of the fibrous form and conforms to the desired shape of the finished article. Resin is admitted to the mold cavity under pressure to impregnate the article. In some instances, it may be desirable or necessary to draw a vacuum with the cavity to ensure complete impregnation and to allow for the escape of any entrapped gases. The mold is then heated to a resin-setting temperature and, thereafter, the finished article is removed from the mold.

The term "cylindrical" as used herein refers to and means the surface traced by any straight line moving parallel to a fixed straight line.

BRIEF DESCRIPTION OF THE DRAWINGS

FIG. 5 is an illustration similar to FIG. 5, but showing the ribbon partially wrapped about one of the cylindrical portions of the winding form;

DETAILED DESCRIPTION OF THE DRAWINGS

Figure 1:
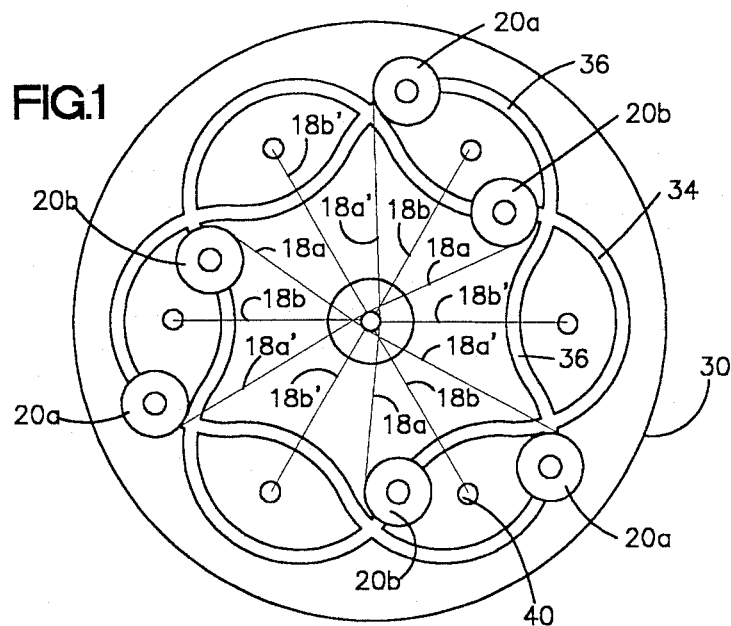
FIG. 1 is a top plan view in diagrammatic form of an apparatus used in the fabrication of the article according to this invention.
Figure 2:
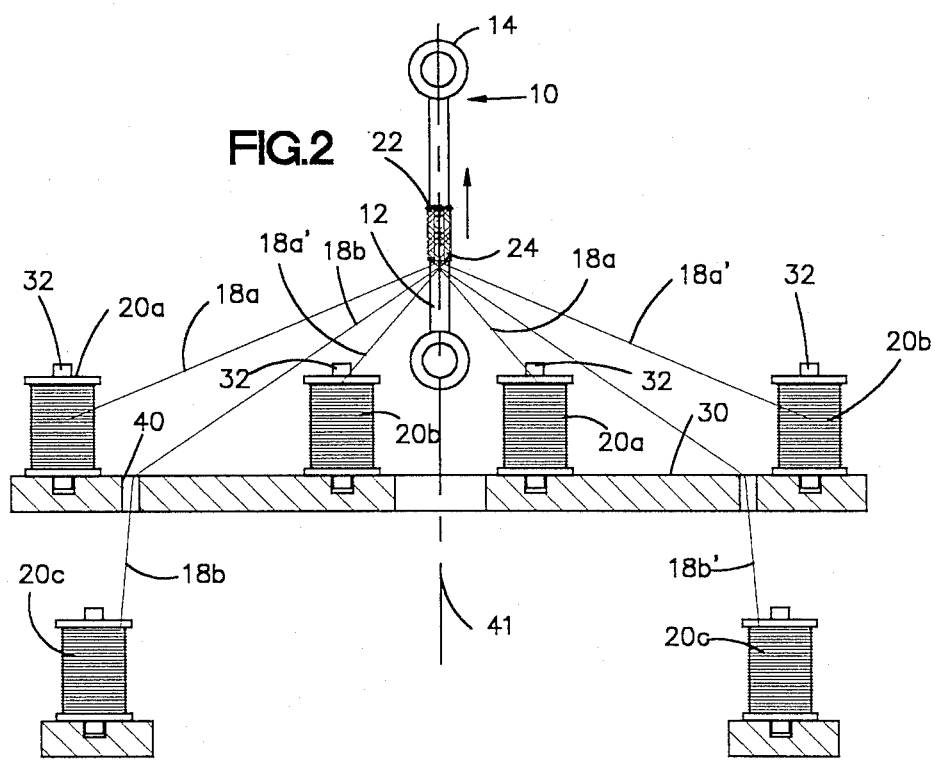
FIG. 2 is a diagrammatic illustration, partly in vertical section, of the arrangement of FIG. 1.

Referring now to the drawings, and particularly to FIGS. 1 and 2, there is illustrated a winding form 10 which comprises a cylindrical rod 12, which comprises a first cylindrical portion of the form 10 and hollow cylindrical eye portions 14 and 16, which comprise second and third cylindrical portions of the form 10 and which have axes parallel to each other and perpendicular to the axis of the rod 12. The rod 12 and the eye portions 14 and 16 may be molded from a suitable thermoplastic or thermosetting molding compound or may be formed from a sacrificial material according to well-known techniques, since the molding form in many instances is not relied upon as providing structural strength to the finished article.

Figure 3:
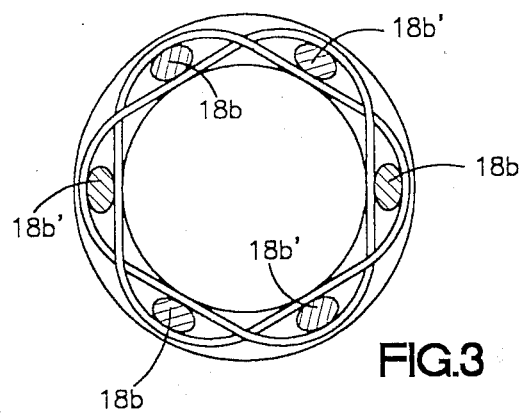
FIG. 3 is an elevational view of the braiding pattern.
Figure 4:
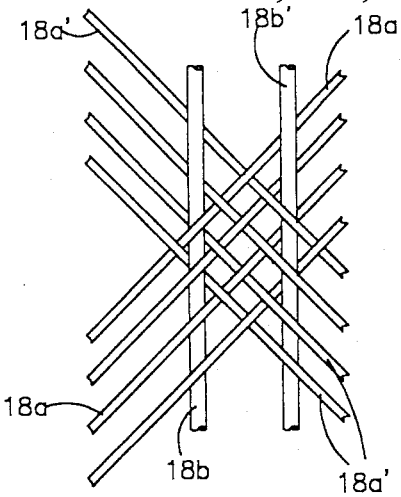
FIG. 4 is a plan view of the braiding pattern.

A plurality of fiber rovings 18, which may be glass fiber rovings, are trained from a corresponding plurality of roving cakes 20 and are tied to the midportion of the rod 12 by suitable fastening means such as adhesive tape or a circumferential winding 22. The winding form 10 is then advanced axially and vertically upwardly, as indicated by the arrow in FIG. 2. A helical braid of woven continuous filaments is applied to the rod 12 as a first cylindrical sleeve 24, which conforms to and encases the outside surface of the rod 12. The helical braid may be formed by means of any conventional braiding machine similar to the one disclosed in the Francis Pat. No. 2,602,766. By following the individual strands of the braid in FIGS. 3 and 4, it will be noticed that the filaments 18a are interlocked with the filaments 18a'. It may be noted that the filaments 18a pass on the outside of the filaments 18b' but on the inside of the adjacent filaments 18b.

A conventional braiding machine is schematically illustrated in FIGS. 1 and 2, and includes a supporting table 30 having a suitable number (six in the present instance) of roving cakes 20a and 20b mounted thereon. The roving cakes 20a and 20b are supported on suitable spindles 32 which fit into guide grooves 34 and 36, which grooves follow a circumferential undulating pattern, as illustrated in FIG. 1. There are two series of roving cakes on the table 30, the roving cakes 20a being characterized herein as the "outer roving cakes," while the roving cakes 20b are considered the inner roving cakes. The only reason for this characterization is to demonstrate more clearly by reference to FIG. 1 that there are two different undulating grooves 34 and 36 which cross over symmetrically, as illustrated.

Beneath the table 30 are disposed a plurality (in the present instance, six) of roving cakes 20c. The filament form each cake 20c is passed through a receptive clearance opening 40 in the table 30 and attached in the previously described manner to the rod 12. Thus, as the form 10 is pulled upwardly in the direction of the arrow in FIG. 2, filaments are pulled off each roving cake. The filaments 18b and 18b' of FIGS. 1 and 2 will now be recognized as being the same as the filaments contained on the cakes 20c, while the braid formed by the filaments 18a and 18a' are the same as those contained on the roving cakes 20a and 20b.

In operation, the form 10 is slowly raised in the direction of the arrow, while the roving cakes 20a and 20b are moved in opposite directions at a uniform rate of speed through their guiding grooves 36 and 34, respectively. Considering for the moment the motion of one spool 20a, it will be seen that it will pass outside and inside alternate filaments 18b and 18b', while at the same time forming an interleaving braid with the filaments from the roving cake 20b. The roving cake 20b works oppositely so that in the finished product there are an equal number of filaments diposed on the outside of each longitudinal filament 18b and 18b', and on the inside. The form 10 is continuously raised at a uniform rate until the braiding operation reaches a juncture zone 38 between the rod 12 and the cylindrical portion 16. This produces a braid in which a first series of filaments including the filaments 18b and the second series of filaments including the filaments 18b' comprises an increasing arithmetical progression in which each consecutive term differs from the preceding by a common difference of at least one.

After the braided sleeve has reached the zone 38, the cylindrical portion 16 is passed through adjacent filaments so that the cylindrical portion 16 is no longer within the cone formed by the filaments, and so that the axis of the rod 12 is angularly related to a braiding axis 41.

Figure 5:
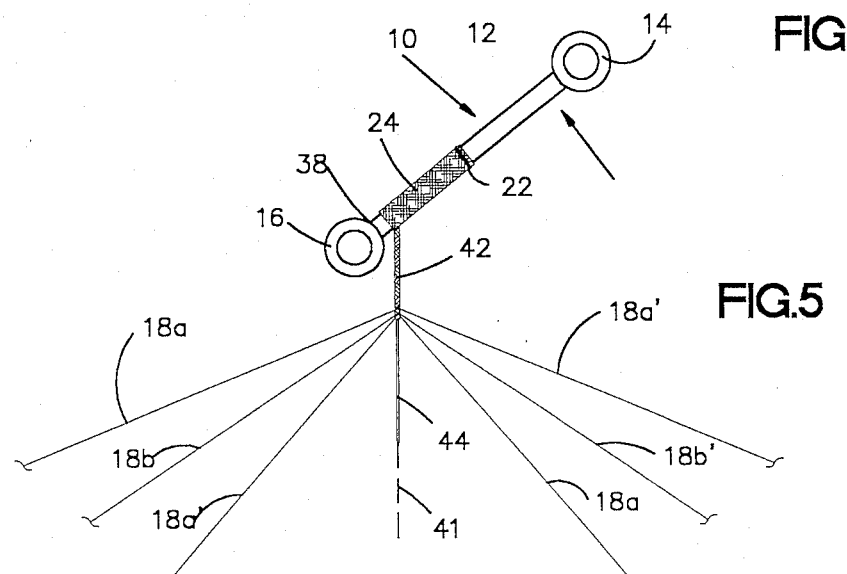
FIG. 5 is a diagrammatic view illustrating the ribbon-forming technique according to this invention.

Nevertheless, the braiding operation is continued, as is illustrated in FIG. 5, so tht a first substantially flat, double-ply braided ribbon 42 is formed. To maintain the dimensional integrity of the ribbon 42, the braiding is woven on a flat, flexible strip of plastic 44 which has a width corresponding to the axial extent of the cylinder 16 and a length corresponding to the circumference of the cylinder 16.

Figure 6:
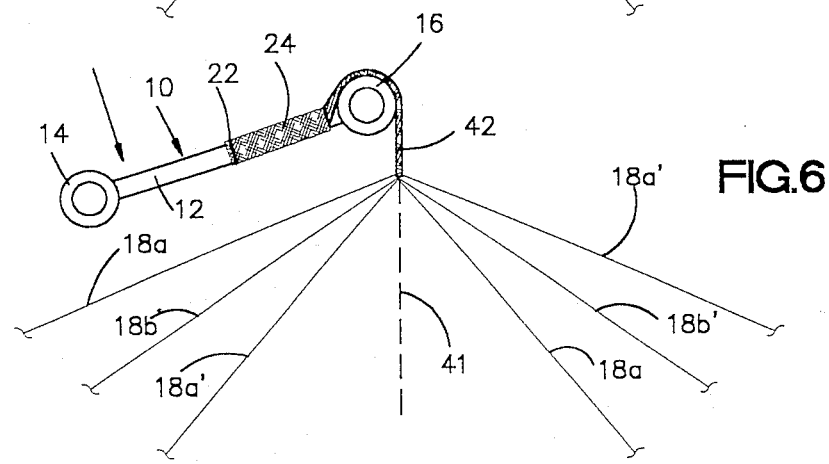
Figure 7:
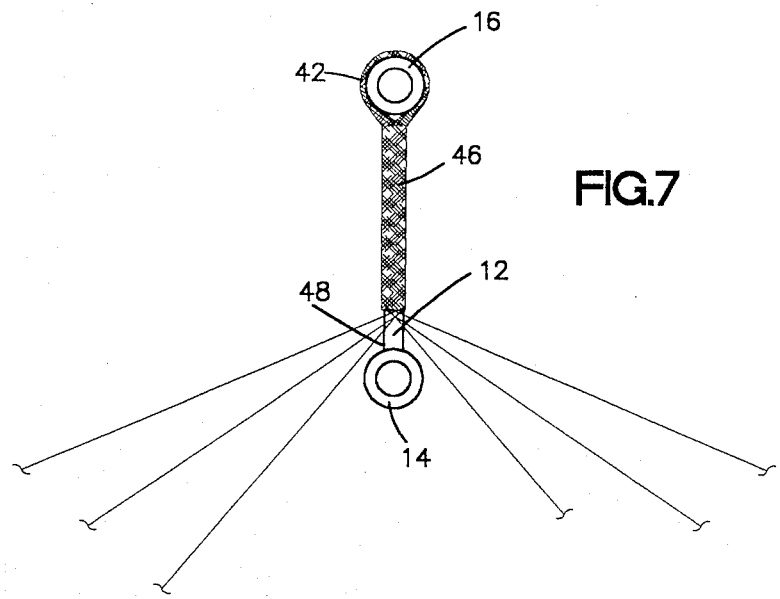
FIG. 7 is a diagrammatic view similar to FIGS. 5 and 6, showing a further stage of the weaving operation.
Figure 8:
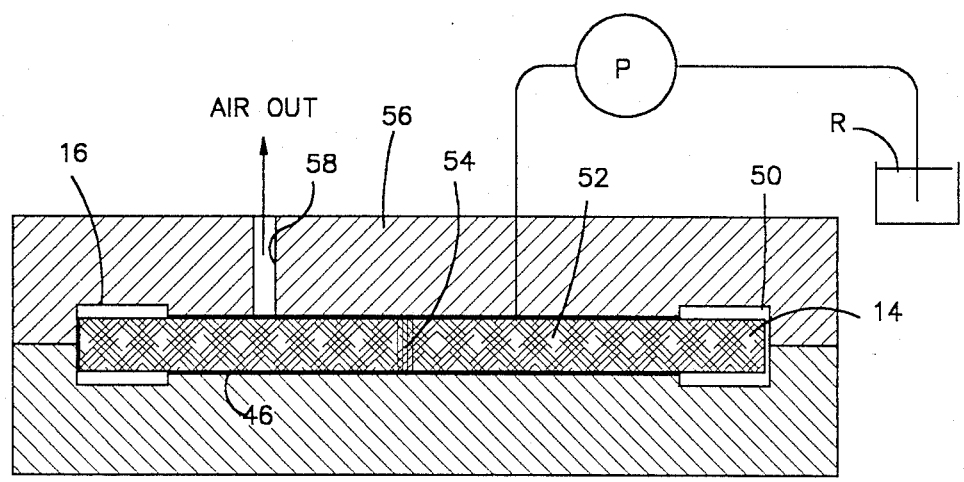
FIG. 8 is a cross-sectional view illustrating the article in a resin-impregnating mold.

After the ribbon 42 has been formed in this manner, the form 10 then is rotated in the direction of the arrows in FIGS. 5 and 6 to wrap the ribbon 42 about the cylindrical position 16 and to pass the cylindrical portion 14 between adjacent filaments until the rod 12 is once again aligned with the braiding axis 41. A second cylindrical sleeve 46 (FIG. 7) is wrapped over the first cylindrical sleeve 24 in the manner previously described, and the sleeve 46 is continued until it reaches a juncture zone 48 between the rod 12 and the cylindrical portion 14. The ribbon-forming operation described with reference to FIGS. 5 and 6 is repeated to form a second ribbon 50 and the ribbon 50 is wrapped about the circumference of the cylindrical portion 14 in the manner previously described in connection with FIG. 6. After the ribbon 50 has been wrapped about the portion 14 and the axis of the rod 12 is once again aligned with the braiding axis 40, a third braided sleeve 52 is woven over the sleeve 46 to the midportion of the form 10, at which point adhesive tape or filaments 54 are wound about the sleeve 52 and the filament ends are cut to release the braided form from the braiding machine.

The fiber-reinforced form is then placed in a mold 56 and a metered amount of resin R is pumped from a reservoir to the mold cavity to fill the cavity and completely impregnate the fibers forming the reinforcement. The mold cavity closely conforms to the desired external dimensions of the molded article so that the external appearance will not exhibit the braided pattern. If desired, or necessary, a vacuum may be applied to the mold cavity through a vent 58, but in any event the vent should be provided so that air is not entrained in the fibers.

The resin may be any suitable thermosetting resin, such as epoxy, polyester, or vinylester, and the reinforcement may be glass, carbon, or metallic filaments. Also, as may be appreciated, thermoplastic resins may be employed.

The various manipulative steps involved in performing the invention may be accomplished by hand or by robotic equipment.

Although the preferred embodiment of this invention has been shown and described, it should be understood that various modifications and rearrangements of the parts may be resorted to without departing from the scope of the invention as disclosed and claimed herein.

What is claimed is:

1. A method of fabricating a fiber-reinforced plastic article having first and second intersecting cylindrical portions which have angularly related longitudinal axes, comprising the steps of producing a braid of woven continuous filaments, applying said braid to said first cylindrical portion as a first cylindrical sleeve which conforms to and encases the outside surface of said first cylindrical portion, passing said second cylindrical portion through the filaments forming said braid, continuing to form said braid of woven continuous filaments as a substantially flat double-ply braided ribbon, and wrapping said ribbon about the outer surface of said second intersecting cylindrical portion.

2. A method according to claim 1, including the step of positioning a first flat flexible web in the portion of the braid forming said ribbon to maintain a predetermined lateral dimension for said ribbon as said ribbon is wrapped about said outer surface.

3. A method according to claim 1, including the step of passing said first cylindrical portion through the filament forming said first braided ribbon after said ribbon has been wrapped about said second cylindrical portion and then applying helical braid as a second cylindrical sleeve to the surface of said first cylindrical sleeve.

4. A method according to claim 3, wherein said second cylindrical portion is provided at one end of said first cylindrical portion and a third cylindrical portion having an axis angularly related to the axis of said first cylindrical portion is provided at the other end of said first cylindrical portion, and comprising the further steps of passing said third cylindrical surface through the filaments forming the helical braid of the second cylindrical sleeve and continuing to form said braid as a second substantially flat double-ply braided ribbon, wrapping said second ribbon about the outer surface of said third intersecting cylindrical portion, and then applying the helical braid as a third cylindrical sleeve to the surface of said first and second cylindrical sleeves.

5. A method according to claim 4, including the step of positioning a second flat flexible web in the portion of the braid forming said second ribbon to maintain a predetermined lateral dimension through said second ribbon as said second ribbon is wrapped about the outer surface of said third cylindrical portion.

6. A method according to claim 5, wherein the axes of said second and third cylindrical portions are parallel.

7. A method according to claim 6, wherein the axes of said second and third cylindrical portions are perpendicular to the longitudinal axis of said first cylindrical portion.

8. A method according to claim 7, wherein said second and third cylindrical portions are hollow.

9. A method according to claim 8, wherein said continuous filaments are glass.

10. A method according to claim 9, including the step of impregnating said first and second ribbons and said first, second, and third sleeves with a thermosetting resin and curing said resin.

11. A method according to claim 10, including the steps of applying said first cylindrical sleeve from a midportion of said first cylindrical portion to said second cylindrical portion, applying said second cylindrical sleeve from said second cylindrical portion to said third cylindrical portion, and applying said third cylindrical sleeve from said second cylindrical portion to said midportion.

12. A method according to claim 11, including the steps of level-winding a first continuous filament about said first cylindrical sleeve at said midportion and winding a second continuous filament about said third cylindrical sleeve at said midportion.

13. A method of fabricating a fiber-reinforced plastic article comprising the steps of providing a winding form having first and second intersecting cylindrical portions which have angularly related longitudinal axes, comprising the steps of securing a multiplicity of fiber filaments to an annular zone of said first cylindrical portion so that said filaments generally define a cone with the longitudinal axis of said first portion coinciding with the longitudinal axis of said cone, and so that said second cylindrical portion is within said cone, helically wrapping a first series of said filaments in a first direction about the surface of said first cylindrical portion while helically wrapping a second series of said filaments in a second opposite direction about the surface of said first cylinder, each of said first and second series comprising an increasing arithmetical progression in which each consecutive term differs from the preceding a common difference of at least one, weaving said first and second series of filaments over and under each other to form a first cylindrical sleeve on said first portion, pivoting said first cylindrical portion in a first direction relative to the longitudinal axis of said cone so that said second cylindrical portion passes between adjacent filaments defining said cone, continuing to weave said filaments as a flat double-ply braided ribbon until the longitudinal extent of said ribbon substantially corresponds to the circumference of said second cylindrical portion, wrapping said ribbon about the circumference of said second cylindrical portion by pivoting said first portion in a second direction opposite said first direction until said longitudinal axis of said first portion is again aligned with the axis of said cone, and continuing to helically wrap and weave said filaments on said first portion to form a second cylindrical sleeve covering said first cylindrical sleeve.

14. A method according to claim 13, including the step of positioning a first flat flexible web in the portion of the sleeve braid forming said ribbon to maintain a predetermined lateral dimension for said ribbon as said ribbon is wrapped about said circumference of said second cylindrical portion.

15. A method according to claim 13, including the step of providing a third intersecting cylindrical portion on said winding form which has an axis angularly related to the longitudinal axis of said first cylindrical position, and including the step of again pivoting said first cylindrical portion in said first direction relative to the longitudinal axis of said cone so that said third cylindrical portion passes between adjacent filaments defining said cone, continuing to weave said filaments as a second flat double-ply braided ribbon until the longitudinal extent of said second ribbon substantially corresponds to the circumference of said third cylindrical portion, wrapping said second ribbon about the circumference of said third cylindrical portion by pivoting said first portion in said second direction until the longitudinal axis of said first portion is again aligned with the axis of said cone, and continuing to helically wrap and weave said filaments on said first portion to form a third cylindrical sleeve covering at least a portion of said second cylindrical sleeve.

16. The method according to claim 15, including the step of positioning a second flat flexible web in the portion of the braid forming said second ribbon to maintain a predetermined lateral dimension for said second ribbon as said second ribbon is wrapped about the outer surface of said third cylindrical portion.

17. A method according to claim 16, wherein the axes of said second and third cylindrical portions are parallel.

18. A method according to claim 17, wherein the axes of said second and third cylindrical portions are perpendicular to the longitudinal axis of said first cylindrical portion.

19. A method according to claim 18, wherein said second and third cylindrical portions are hollow.

20. A method according to claim 19, wherein said continuous filaments are glass.

21. A method according to claim 20, including the step of impregnating the ribbons and sleeves with a thermosetting resin and curing said resin.

22. A method according to claim 21, including the steps of applying said first cylindrical sleeve from a midportion of said first cylindrical portion to said second cylindrical portion, applying said second cylindrical sleeve from said second cylindrical portion to said third cylindrical portion, and applying said third cylindrical sleeve from said second cylindrical portion to said midportion.

23. A method according to claim 22, including the steps of level-winding a first continuous filament about said first cylindrical sleeve at said midportion and winding a second continuous filament about said third cylindrical sleeve at said midportion.

* * * * *

UNITED STATES PATENT AND TRADEMARK OFFICE
CERTIFICATE OF CORRECTION

PATENT NO. : 4,857,124

DATED : August 15, 1989

INVENTOR(S) : James P. Shobert and Elson B. Fish

It is certified that error appears in the above-identified patent and that said Letters Patent is hereby corrected as shown below:

```
Column 1, line 59, "means" should read --axes--.
Column 2, line 29, "position" should read --portion--.
Column 2, line 30, "position" should read --portion--.
Column 2, line 50, "with" should read --within--.
Column 3, line 61, "form" should read --from--.
Column 6, line 59, "sleeve" should be omitted.
Column 6, line 67, "position" should read --portion--.
```

Signed and Sealed this

Twenty-sixth Day of June, 1990

Attest:

HARRY F. MANBECK, JR.

*Attesting Officer*  *Commissioner of Patents and Trademarks*